(12) United States Patent
Rao (10) Patent No.: US 8,532,636 B2
(45) Date of Patent: Sep. 10, 2013

(54) CLIENT AND SYSTEM FOR PROVIDING SELECTABLE PRODUCTS AND SERVICES LISTS TO USERS OF MOBILE DEVICES

(76) Inventor: Bindu Rama Rao, Laguna Niguel, CA (US)

( * ) Notice: Subject to any disclaimer, the term of this patent is extended or adjusted under 35 U.S.C. 154(b) by 0 days.

(21) Appl. No.: 13/554,619

(22) Filed: Jul. 20, 2012

(65) Prior Publication Data

US 2012/0290391 A1  Nov. 15, 2012

Related U.S. Application Data (63) Continuation of application No. 11/897,183, filed on Aug. 28, 2007, which is a continuation-in-part of application No. 11/821,771, filed on Jun. 25, 2007, now Pat. No. 8,135,331.

(51) Int. Cl.
| | |
|---|---|
| *H04M 3/42* | (2006.01) |
| *H04H 60/21* | (2008.01) |
| *H04H 60/09* | (2008.01) |
| *G06Q 20/00* | (2012.01) |
| *G06Q 30/00* | (2012.01) |
| *G06Q 50/00* | (2012.01) |

(52) U.S. Cl.
USPC ........ 455/414.1; 455/2.01; 455/3.04; 705/72; 705/78; 705/14.64; 705/313; 705/347

(58) Field of Classification Search
USPC ................... 455/410, 411, 414.1, 2.01, 3.04; 705/64, 67, 72, 73, 75, 76, 77, 78, 14.19, 705/14.4, 14.41, 14.49, 14.64, 27, 313, 347
See application file for complete search history.

(56) References Cited

U.S. PATENT DOCUMENTS

| | | | |
|---|---|---|---|
| 7,542,920 B1 * | 6/2009 | Lin-Hendel | 705/26.3 |
| 2003/0083895 A1 * | 5/2003 | Wright et al. | 705/1 |
| 2007/0022214 A1 * | 1/2007 | Harcourt | 709/246 |

* cited by examiner

*Primary Examiner* — Christopher M Brandt (57) ABSTRACT

A system for mobile devices that facilitates the creation and dissemination of interactive media to a plurality of mobile devices and PCs/laptops that comprise a client component. The interactive media may comprise of a list of products and services that are for sale and the user can select one or more for purchase. It may also comprise a list of real estate entries with associated user interest solicitation and the user can indicate his interest in one or more of the entries. The server can help the user make an appointment to view the corresponding real estate properties.

19 Claims, 10 Drawing Sheets

CLIENT AND SYSTEM FOR PROVIDING SELECTABLE PRODUCTS AND SERVICES LISTS TO USERS OF MOBILE DEVICES

CROSS REFERENCES TO RELATED APPLICATIONS

The present application is a continuation of, makes reference to, claims priority to, and claims benefit of U.S. non-provisional patent, Ser. No. 11/897,183, entitled "SYSTEM FOR PROVIDING INTERACTIVE ADVERTISEMENTS TO USER OF MOBILE DEVICES", filed on Aug. 28, 2007, which in turn is a continuation-in-part of, makes reference to, claims priority to, and claims benefit of U.S. non-provisional patent, Ser. No. 11/821,771, entitled "SYSTEM FOR PROVIDING INTERACTIVE USER INTEREST SURVEY TO USER OF MOBILE DEVICE", filed on Jun. 25, 2007, now U.S. Pat. No. 8,135,331. The complete subject matter of each of the above is hereby incorporated herein by reference, in its respective entirety.

This patent application makes reference to U.S. provisional patent, Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States patent application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

BACKGROUND

1. Technical Field

The present invention relates generally to the interactions between mobile handset and it's a server within a network, and more specifically to the ability to create and send interactive advertisements to a mobile handset and receive user responses.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

In a PC based access to a website, often Internet advertisements and presented to a user. For example, an image and accompanying text for an advertisement is displayed with a link to a web page or to some additional product information. If a user clicks the advertisement, those links are exercised and the webpages are displayed. Unfortunately, these webpages are annoying to some users and websites block such advertisements. Often users block them in their browsers, especially those that are popup-ads. However, such Internet websites and popup ads are not useful or convenient or appropriate for mobile advertisements, wherein a mobile user with a mobile phone is not likely to either receive or conveniently review such Internet based advertisement. Therefore, creating appropriate mobile advertisements for mobile phones is not easy. Internet webpages that provide advertisements are usually not appropriate for mobile phone users for several reasons.

In addition, some mobile advertisements prompt user to purchase a product and take them to a shopping cart for sales. The shopping carts and associated webpages prompt users for shipping address, billing address, credit card information etc. These webpages with shopping carts are neither appropriate for mobile phones nor convenient for a user who might want to purchase the advertised product. The whole process of prompting necessary information from a user using a mobile phone is inconvenient due to the inability of the user to enter a large amount of text conveniently using the small keys of a mobile phone, and due to small screens on such devices. Internet advertisement based sales completion process provided by websites to a typical user are not convenient, and often incompatible with small form factor devices such as mobile phones and PDAs. The user can neither conveniently read, browse through the advertisements presented nor provide detailed shipping, billing and other information needed to compete sales via the user's mobile phone.

Information access from typical Internet based websites using mobile devices are quite often unsatisfactory and not useful due to several factors, not least of which is the multi-media and graphics rich format in which most Internet websites are designed. In addition, Internet websites tend to be and made available with a lot of graphics and prone towards needless verbosity of text. A mobile phone with a small screen is not a good candidate for viewing such complicated and graphics rich (with graphics, flash screens, video components, etc.) content—imagine a webpage being presented to a user that has a music component, a whole a page of text (over 3 KB of text) and three large diagrams, and a table of information, all on the same webpage. Such a multi-media webpage is very typical, and is obviously unsuitable for access using a mobile device, such as a small cell phone.

User interaction in real time, such as those provided for a user using a PC on the Internet, are often not possible for a user using a cell phone. For example, the amount of textual information presented to a user cannot be a full page of textual information that is typically made available o a PC. Graphical information also cannot be large and too many graphical images should not be on the same webpage. A typical website provides a rich multi-media experience that has several graphical images, large amounts of text, tables, etc. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Often webpages on the Internet provide detailed information to a user while soliciting inputs from a user. Thus, there is a problem in presenting a mobile user with information in order to solicit user input when the user is using a cell phone. Soliciting user input from a user when the user is using a cell phone, rather than a PC, is a big problem.

Mobile devices such as a cell phone are therefore devices for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unsuitable, unmanageable and difficult to browse and navigate on a cell phone with a small LCD screen and small keyboard for user input.

There is often a need to present a user with a list of items and be able to determine which of those items interest the user. For example, the list of items could be a list of camcorders or a list of houses for sale. There are no easy ways to do this if the user is using a mobile device. In fact, if an MMS email is sent to the user with all the items (each item may include graphics, text, etc.), the user has to in the first place, subscribe to the expensive MMS service. Secondly, he has to be able to receive MMS service on his device. Thirdly, after receiving an email with all those items, the user has to browse them, and send an email back from the device to show which items he is interested in. The email response would require the user to include the entire MMS message (or significant portions thereof) with his comments incorporated in order to provide the context for the response showing selective interest. This inclusion of received multi-media text would make the email response quite large (unnecessarily large). On the other hand, if the user were to not include significant portions of the received mail in his response, his responses may be read out of context or be associated with the wrong context. Thus, information solicited from a user via a email response is cumbersome, despite being expensive and email response from mobile being a painful experience, and inadequate.

Surveys cannot currently be sent to mobile devices easily, as responding to surveys on a mobile device is not easy due to the large amounts of text accompanying each question and the limitations of a small screen that are not appropriate to review large amounts of text. Also, most surveys require some text entry, something very inconvenient for most people who use mobile phones.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
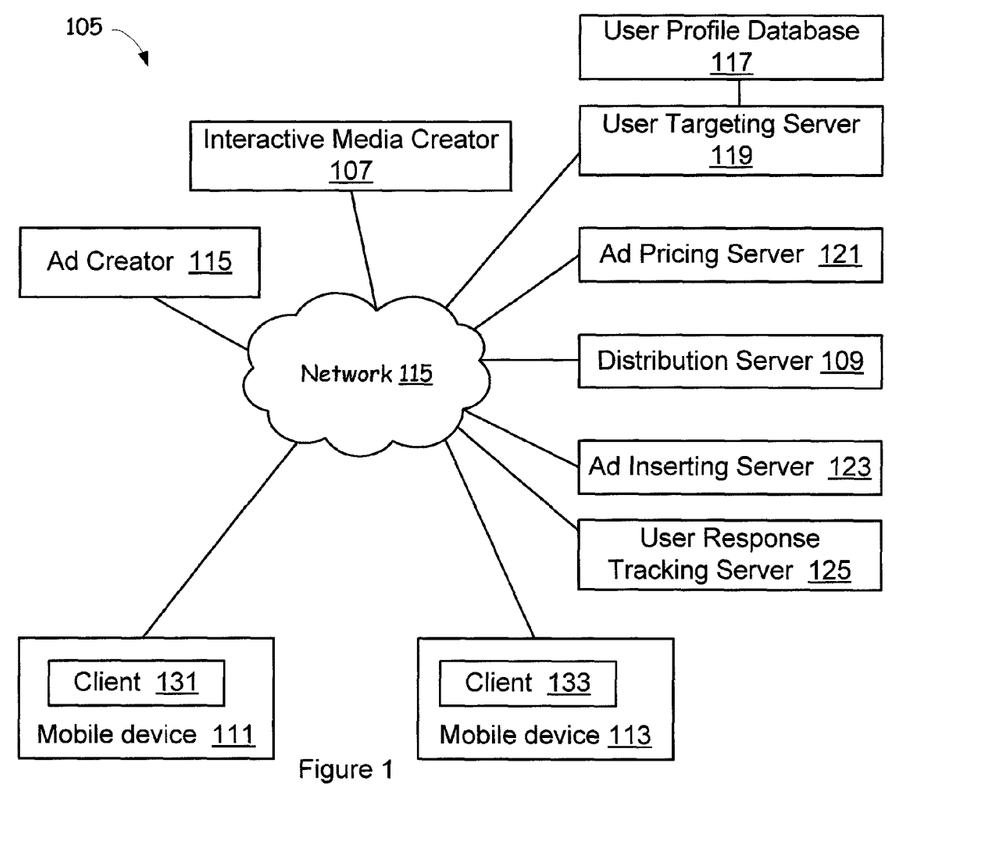
FIG. 1 is a perspective block diagram of a network that supports creation and dissemination of advertisements and product lists to mobile devices and the subsequent collection of purchase requests and user interest information from the mobile devices.

FIG. 1 is a perspective block diagram of a network 105 that supports creation and dissemination of advertisements and product lists to mobile devices and the subsequent collection of purchase requests and user interest information from the mobile devices 111, 113. The network 105 facilitates the creation and dissemination of advertisements form an ad creator 115 and interactive media from an interactive media creator 107. The interactive media and advertisements can be disseminated to a plurality of recipient devices, such as the mobile devices 111, 113. For example, a user interest survey created using the interactive media creator 107 is disseminated to the recipient devices 111,113 in a form that is compatible with the capabilities of the respective mobile devices 111, 113, and wherein the preferences of the user are also factored in.

The network 105 comprises the interactive media creator 107, the plurality of mobile devices 111, 113 and a distribution server 109. The network 105 also comprises a user profile database 117, a user targeting server 119, an advertisement pricing server 121, an advertisement inserting server 123 and an user response tracking server 125, all communicatively coupled to the distribution server 109 via the network 115, which may be a public or private communication network, a wireless network, a cellular network, a LAN or the Internet. Some of the plurality of mobile devices are cell phones, PDAs and various hand held devices while others may be laptops, small PCs/computers, etc. The display of interactive media in a recipient mobile device 111 requires the use of a corresponding client component 131, such as a Qello or QClient component from Vaudiofone that can display/render interactive media components, one component or item at a time. For example, a multi-item user interest survey is displayed one item at a time. A multi-product list is displayed one product at a time. A list of real estate on sale is displayed one house or property at a time with accompanying text, graphics, and audio components. In general, the client component 131, 133 in the mobile devices 111, 113 are capable of playing audio-assisted interactive media on the mobile device or a PC where it is installed.

When the interactive media received for display by the mobile devices 111, 113 is a list of products, the user is presented with the list of products in a list of panels, one product (item in general) in each panel with accompanying text, graphics and audio information. Supplementary information for each product in the form of textual, audio and graphic content is also provided. As the user views each product from the list of products, the user can read the textual information, see the graphics and listen to the audio information provided. Additional details can be retrieved in the form of supplementary information provided. When a user views any product in the set of products provided during one user session, the user can show interest in one or more products, select them for trials, etc. In addition, an offer to purchase some of the products is provided, which the user can exercise to purchase them. The user is provided an opportunity to purchase a product, for example, using a radio button that prompts user to "purchase". At the end of the viewing process (end of a session typically), the user's responses are sent to the distribution server, which processes them. If the server detects that the user has selected the "purchase" option for any product, it initiates an approval request for a sales transaction to be conducted with one or more merchants/businesses. For seeking user approval for the purchase of the product using a user billing and shipping information previously provided by an user during a registration process, a user profile is accessed, that is available to the server.

The user profile, typically provided by a user during a registration process, that is stored in the user profile database 117, provides a shared secret, such as a PIN, in addition to a billing account, a billing address and a shipping address. For example, employing the user's mobile device 111, specifically via the client software 131 in the mobile device 111, the user is prompted for a PIN number to authenticate the user as part of an approval process for a purchase initiated by the user. The PIN number (or some other code previously registered by user) provided by a user is securely communicated to the distribution server 109, for example over an SSL connection. Then, the distribution server 109 verifies the PIN, with the help of information retrieved from the user profile database 117, as necessary, and on successful verification, conducts one or more sales transactions, sends an invoice to the user via the mobile device 111. It also sends him an email to the user confirming the purchase, which may be received and viewed by the user of his mobile device 111 or on some other laptop/PC/computer. In addition, the distribution server 109 employs a billing account provided by the user during a previous registration process to conduct the sales transaction, such a billing account typically comprising a credit card number, an expiry date, security code, etc. that is stored in the user profile database 117.

In one embodiment of the present invention, the interactive media being displayed to the user, in a list of products, comprises a prompt to user to "make an appointment". For example, if an individual product comprises a real estate instance such as a house for sale, the user can make an appointment to see the house. The associated product item (real estate on sale, for example) comprises a radio button with descriptive text comprising the phrase "make an appointment" that can be selected by a user to make a request for an appointment to see the house. If the user selects that radio button associated with the individual product on display (in the appropriate panel from the product list) to make an appointment, the distribution server 109 processes the request for an appointment and creates a calendar entry in the distribution server 109. A copy of the calendar entry is sent to the user using the client 131 of the mobile device 111, an email or an SMS facility. In a related embodiment, a questionnaire is sent to the user on his mobile device 111 to prompt the user to select one of several available appointment schedule/slots, the response provided by user being used to setup an appointment. In another related embodiment, the user is prompted with an audio query with accompanying multiple choice text that aids the user in selection of an appointment schedule. The user's response is received and processed by the distribution server 109, and a calendar entry or an invitation to attend a meeting is sent to the user via the client, an email or an SMS notification (as appropriate). In a related embodiment, the client 131 in the mobile device 111 prompts the user to enter a security code when the user's response to the list of products (or list of real estate entries) comprises a response indicating interest in making an appointment for visiting one (at least one) of the real estate property for sale. The user enters a security code (such as a PIN code) that has been previously established (out-of-band), and subsequently made available to the distribution server 109.

To target users that are appropriate for an ad, the distribution server 109 uses one or more targeting strategies/techniques provided by the user targeting server 119. For example, in one technique, the price paid by a user for his residence is determined (from publicly available online sources or from databases provided by or accessible by the user targeting server 119), then the minimum monthly payments for a 30-year mortgage (could be other reasonable mortgage terms too) is determined, and subsequently a minimum monthly household salary for that user residence is determined, The minimum monthly household salary is correlated and adjusted to the average household income in that city/neighborhood, as appropriate. Then, the phone number of that residence is stored with an entry to the computed minimum monthly household salary for that household. The computed minimum monthly household salary is used to determine if a user is an appropriate target for a specific advertisement placed by the ad creator 115 (for example). The computed minimum monthly household salary is not used if the user has provided a salary amount or a salary range in the user profile that is typically created by the user during a registration process and stored for subsequent access in the user profile database 117.

When an ad creator creates an advertisement or a series of advertisements, each advertisement comprises a product entry that is displayed in a product panel, with accompanying text, graphics and audio components, and sometimes with a video clip too. The advertisements with such product entries is therefore an interactive media. The client software 131, 133 gets the interactive media that are rendered/displayed for the user, wherein the user is often able to interact and provide responses to prompts, select one or more of a multiple choice set, etc.

Other forms of interactive media such as questionnaires, audio guided activities (AGA), user interest surveys etc. can also be displayed by the mobile devices 111, 113, employing the client software 131, 133 respectively. The client 131, 133 also supports insertion and display of advertisement during display of the interactive media. For example, the client 131, 133 can insert an advertisement for a vacation plan during the display of a hotel experience survey to a user, such an advertisement forwarded to the user's mobile device by the distribution server 109, based on, for example, the targeting by a specific advertiser (advertisement creator or some such entity) or based on targeting logic at the distribution server. In a different scenario, during the display of a questionnaire or the display of an AGA, the client 131, 133 inserts an advertisement first, if provided, before the actual interactive media is rendered. In the client 131, 133 (such as the Qello client), if the recipient device 111, 113 displays the provided adhoc questionnaire or an AGA, towards the end of such display, an advertisement is played, whichever advertisement happens to be inserted into the associated interactive media by the distribution server 109.

In one embodiment, the advertisement is preloaded onto device in lazy mode and used with next user interaction/viewing of content. The advertisement inserted can be based on category of questionnaire or AGA being sent to user. It may be provided by the vendor of questionnaire/AGA or by a different advertiser.

An advertisement can be inserted at beginning, at the end, or at any intermediary position/step of an interactive media. The advertisement can be in audio form, video form, streaming media form, etc. or a combination thereof. They can be provided as an individual item among n-items of an interactive media, such as an individual entry among N-questions of a questionnaire, as a step, albeit extra or dummy step in a N-step AGA, etc. They can be inserted by the client software 131, 133 in the mobile devices 111, 113 respectively, or by the distribution server 109 with the help of the advertisement inserting server 123.

The ad creator 115 is used by a product manufacturer, advertising agency, etc. to create an advertisement and upload it to the distribution server for dissemination. It can also be used by them to select from a list of recipients with the help of the user targeting server 119. Alternatively, they can provide user selection criteria for an advertisement created and upload the criteria to the distribution server, along with an indication of the number of targets (such as 500 users of a particular type of user profile) they need to disseminate the advertisement to. The distribution server 109 stores and processes the user selection criteria and employs it to determine a list of recipient mobile devices 111, 113. For example, it can communicate the user selection criteria to the user targeting server 119 and receive a corresponding list of recipient mobile devices that it subsequently employs to disseminate the advertisement.

The ad creator 115 also provides a user, who is typically a manufacturer of a product who needs to place an advertisement, an employee of an advertising agency that is conducting a campaign, etc., to request a price/quote for disseminating the advertisement, the price or quote being provided by the advertisement pricing server 121. The user can then adjust the user selection criteria or the number of targeted individuals based on the price or quote received before uploading the advertisement. The user can also subsequently change the user selection criteria or the number of targeted individuals with the help of the appropriate management webpages provided by the distribution server 109. The advertisement pricing server 121 determines a current price and provides a price/quote to the user of the ad creator 115 (or to the distribution server 109, as appropriate). It can determine the current price based on several criteria, such as projected/forecasted demand for targeted users, the season (holiday season, vacation season, etc.), the number of targeted users, the product category, the manufacturer or marketing agency involved, previous history of conducting business with them, etc.

In one embodiment, at least one of the user profile database 117, the user targeting server 119, the advertisement pricing server 121, the advertisement inserting server 123 and the user response tracking server 125 are combined or integrated into the distribution server 109.

In one embodiment, the client components 131, 133 are downloadable java code (such as J2ME and MIDP 2.0 based client side software) that can be downloaded from the distribution server 109 and installed on the mobile devices 111, 113.

Figure 2:
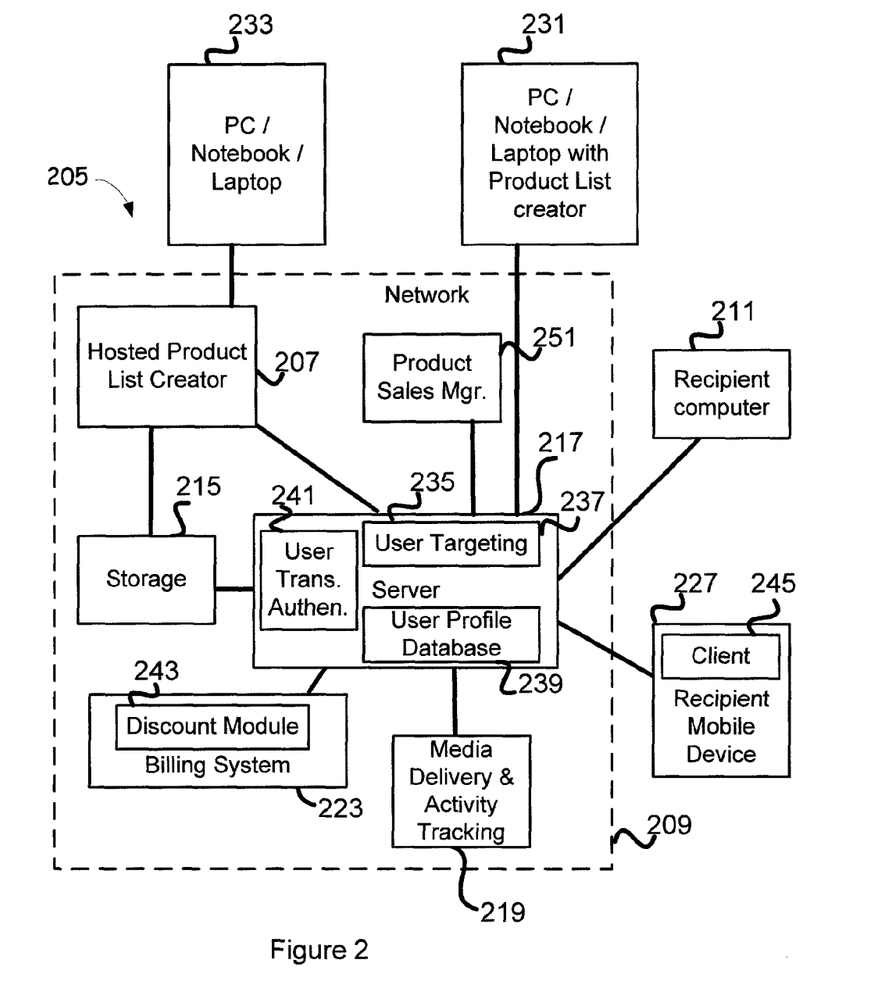
FIG. 2 is a schematic block diagram of a network for creating and disseminating advertisements and interactive media to a plurality of recipient mobile devices and recipient computers.

FIG. 2 is a schematic block diagram of a network 205 for creating and disseminating advertisements and interactive media to a plurality of recipient mobile devices 227 and recipient computers 211. The advertisements and interactive media are created by a user using a PC/notebook/laptop 233 to access a hosted product list creator 207 or employing a PC/notebook/laptop with the product list creator 231, the created advertisements and interactive media being stored at the storage 215 in the network 205 that is accessible by a server 217 that disseminates them to a recipient mobile device 227 and to a recipient computer 211, as appropriate.

The network 215 comprises the hosted product list creator 207, a product sales manager 251, the storage 215, a billing system 223, a media delivery and activity tracking system 219, all communicatively coupled to the server 217. The server 217 comprises a user transaction authentication component used to authenticate user access and user purchases and a user profile database 239 that comprises user billing account, billing address, shipping address, passwords for user authentication, PIN codes for user purchase authentication, etc. The server 217 also comprises a user targeting component 237 that is used to determine target users (and their mobile devices or PC locations/addresses, etc.) and means to communicate a product list or interactive media to them. In one embodiment, the PIN codes are prompted by the client software 245 in the mobile device 227 if the user has selected at least one of the products from the displayed product list for purchase. This prompting occurs without the server subsequently asking the user for the PIN code or for a security code in general, that can be used for authenticating the user for the purchases. In addition, the PIN code is encrypted by the client and communicated to the distribution server 217 for confidentiality and non-repudiation.

The billing system 223 comprises a discount module 243 that can compute discounts to monthly billing (monthly mobile phone service charges) for individual mobile phone users based on the level of participation (and diligence in participation, etc.) in reviewing product lists communicated to them by the server 217. The discount module 243 makes it possible to compute and apply discounts to monthly phone bills and monthly charges for other services subscribed to or associated with various category of mobile phone users who participate in various product list reviews, interactive media based surveys, and advertisements in general. The product sales manager 251 helps in conducting a sales transaction with an external sales server/system (not shown) when the user of the recipient computer 211 or the recipient mobile device 227 indicate their desire to purchase one or more products from a product list displayed on their corresponding mobile devices/computers.

Figure 3A:
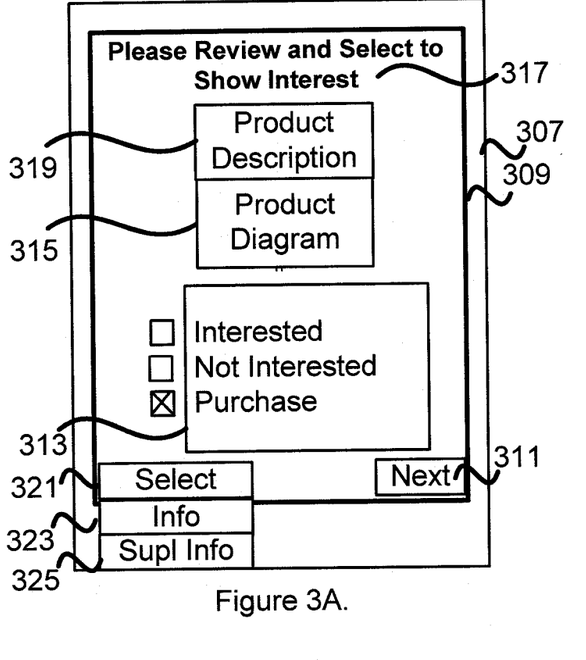
FIG. 3A is an exemplary screen on a mobile device that is provided by a client software in the mobile device that displays interactive media, advertisements, etc. communicated by a distribution server.

FIG. 3A is an exemplary screen 309 on a mobile device 307 that is provided by a client software in the mobile device 307 that displays interactive media, advertisements, etc. communicated by a distribution server. The exemplary screen 309 comprises various components of an individual product from a list of products currently being displayed, the individual product comprising a textual preamble 317, a textual product description 319, a product diagram 315 (a graphic image in standard formats such as TIFF, Gif, PNG, BMP, JPEG, etc.) a multiple choice set 313 from which the user can select from, and one or more soft keys or buttons 321, 323, 325, 311. The user can select one or more of the multiple choice set 313 based on the type of multiple choices—mutually exclusive or multiple select types, etc. For example, an individual product can comprise of a multiple choice set 313 of three mutually exclusive radio buttons whose text are Interested, Not interested, and Purchase. Based on user selection of one of these radio buttons, the distribution server would respond back to the user. For example, if the user selected a radio button indicating a desire to "purchase" the current product, the server processes this request when the user responses (such as when for all products in the product list being reviewed) are sent to the distribution server from the mobile device (by the client software that displays the product list). The distribution server then seeks user's approval and prompts user for a PIN code that aids user purchase authentication, prior to conducting a sales transaction with a manufacturer of the products being purchased or with a business/merchant associated.

If the user selects Info 323 soft key, then additional information, often in the form of audio information is provided. If the user selects Supl Info 325 soft key, then supplementary information, in the form of textual, graphic and audio information is provided, as necessary. If the user selects Next 311 soft key, then the next product in a list of products is displayed, if any.

Figure 3B:
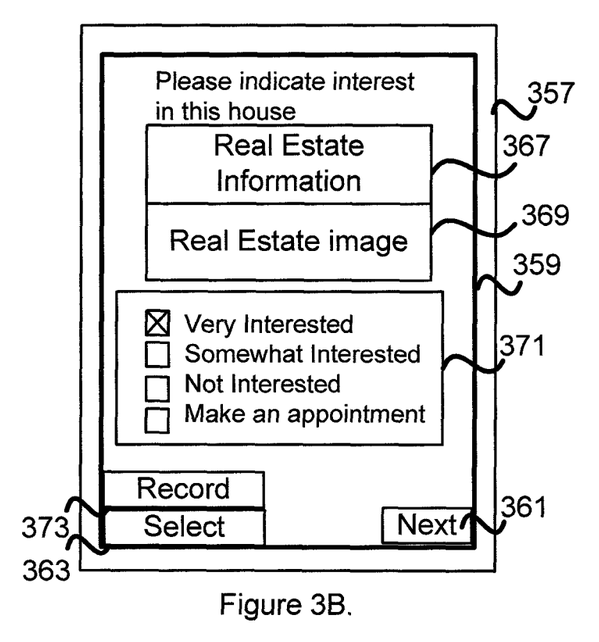
FIG. 3B is an exemplary screen on a mobile device that is provided by a client software in the mobile device that displays interactive media, such as real estate information on sale in a region of interest to a user, communicated by a distribution server.

FIG. 3B is an exemplary screen 359 on a mobile device 357 that is provided by a client software in the mobile device 357 that displays interactive media, such as real estate information on sale in a region of interest to a user, communicated by a distribution server. The exemplary screen 359 comprises various components of an individual real estate entry, such as a residential house or property from a list of residential houses or property currently being displayed, the individual residential house comprising a textual preamble 317, a textual real estate information 367, a real estate image 369 (a graphic image in standard formats such as TIFF, Gif, PNG, BMP, JPEG, etc.) a multiple choice set 371 from which the user can select from, and one or more soft keys or buttons 363, 361. The user can select one or more of the multiple choice set 371 based on the type of multiple choices—mutually exclusive or multiple select types, etc. For example, an individual real estate entry can comprise of a multiple choice set 313 of four mutually exclusive radio buttons whose text are Very Interested, Somewhat interested, Not Interested and Make an appointment. Based on user selection of one of these radio buttons, the distribution server provides additional follow up service. For example, if the user were to select "Make an appointment" for one or more real estate entries, then the distribution server makes an appointment for the user to visit the associated real estate entry—a residential house or property (for example). The appointment is communicated to a real estate agent (who might have sent the real estate list to the user) or agency, and to the user—via an email, a calendar object/instance in standard format (such as an iCalendar instance), an SMS message, etc.

An embodiment of the interactive media creator 107 that is customized to address the specific needs of the real estate industry is employed that creates and disseminates the real estate information on sale in a region of interest to a user of a mobile device. Such an interactive media creator is called "real estate content creator" and it facilitates creation of the list of real estate entries that are sent to the mobile device to be viewed and optionally responded to by the user. The real estate content creator makes it possible for a real estate agent to enter an MLS listing number and provide an audio input associated with it, which is then packaged as an individual real estate entry, the other textual descriptions and graphic descriptions retrieved from a local or remote MLS listing service or MLS listing database. Thus, one or more individual real estate entries can be assembled by the real estate agent into a customized list of real estate entries, tailored to the needs of an individual mobile phone user (a potential customer of the real estate agent presumably). Thus, with minimal inputs from a user—only an MLS number, and by providing customized audio inputs to the real estate content creator, a real estate list for a user is created. The real estate content creator can retrieve or fill in the accompanying textual and graphic content—retrieved from a database or an (multiple listing service (MLS). Alternately, the distribution server 109 retrieves and fills in (into an associated XML template, for example) descriptions of each of the residential homes and properties listed and also incorporate associated images (in JPEG, BMP, PNG or other relevant formats). In a related embodiment, the user of the real estate content creator, such as the real estate agent, provides only the address of the residential house and property and the audio inputs describing the sale, and the rest of the information is filled in by the real estate content creator 107 (or the distribution server 109). The MLS is a service that real estate agents use to list properties for sale and maintain digital pictures, and information about the property like asking price, square footage, number of rooms, etc. Typically, real estate agents use computer applications to search through the entries in the MLS to find a suitable property for a buyer. In the present invention, the real estate agents use the real estate content creator to create a customized message to a user, that includes a list of real estate entries, each entry comprising details retrieved from an MLS database or service in addition to audio inputs (such as a voice recording) provided by the real estate agent (for example), each entry also comprising a multiple choice selection that allows the user on the mobile device to indicate an interest level and also request an appointment to visit the corresponding property.

The Select 363 softkey/button is used by the user to select one or more of the multiple choices provided, as necessary. In general, the audio assisted real estate entry (form the list of real estate entries) presented by the client component on the screen 359 on the mobile device 357 provides product/service/item of potential interest to user, with a list of radio buttons for user to select from, to show interest level. The radio buttons can be mutually exclusive or multiple selection. In one embodiment, the user reviewing the current real estate entry can provide audio feedback on that particular entry to the sender, using the Record 373 softkey, which is saved by the client and forwarded to the sender (via the distribution server 109, for example) subsequently.

Using a Next softkey/button 361 on the screen 359, a user can advance to the next real estate item on the current user interest survey. The screen of the client component 359 can display user interest items from different categories of items too, within the same user interest survey, if necessary.

Figure 3C:
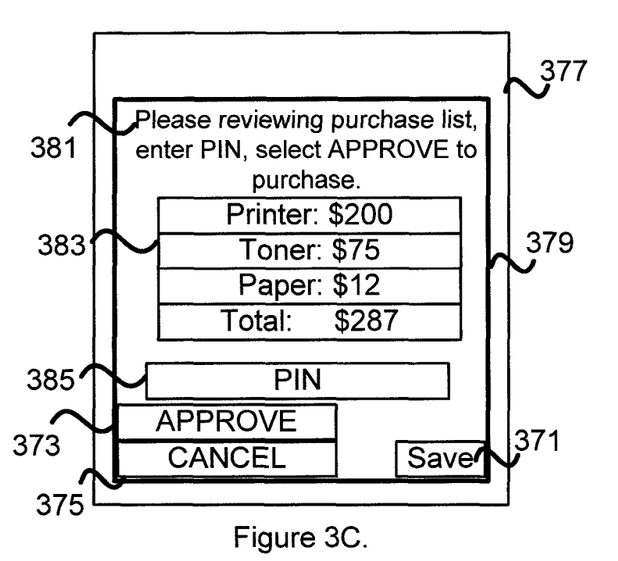
FIG. 3C is an exemplary screen on a mobile device that is provided by a client software in the mobile device that displays purchase list of products selected for purchase by a user and prompts the user to enter a PIN and approve the purchase.

FIG. 3C is an exemplary screen 379 on a mobile device 307 that is provided by a client software in the mobile device 377 that displays purchase list of products selected for purchase by a user and prompts the user to enter a PIN and approve the purchase. The purchase list is \communicated by a distribution server after a user has reviewed a product list and selected one or more products for purchase. The exemplary screen 379 comprises various components of an individual purchase list comprising a textual preamble 381, a list containing product names and associated prices 383, a text box 385 for entry of a PIN or some other security code by the user to be used for authentication and user approval, and one or more soft keys or buttons 373, 375, 371. The soft key APPROVE 373, when selected by the user, sends the entered PIN code to the distribution server (or to an alternative server specified), often in a secure mode employing SSL or TLS based transport layer security. In one embodiment, it is encrypted by the mobile device and sent using default transport mode that is not very secure, the distribution server (or any recipient server) being capable of decrypting it upon receipt. Such encryption and decryption of the PIN aids user authentication and non-repudiation.

Figure 4:
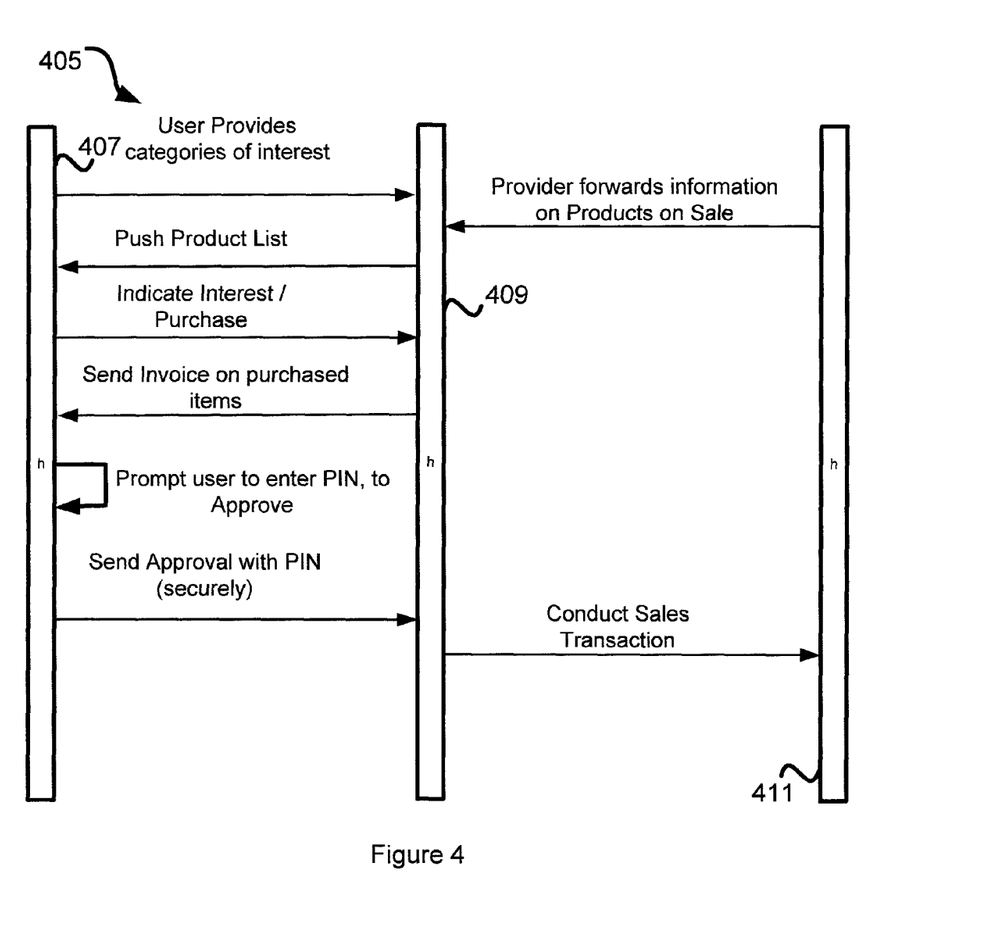
FIG. 4 is a flow chart depicting typical information exchange between a mobile device, a distribution server and a manufacturer or business system providing products for sale.

FIG. 4 is a flow chart depicting typical information exchange between a mobile device 407, a distribution server 409 and a manufacturer or business system 411 providing products for sale. The user of the mobile device 407 provides information on categories of interest to the distribution server 409. The provider (manufacturer or business system 411, etc.) forwards information on products for sale to the distribution server 409 as and when required. The distribution server 409 pushes the product list to the mobile device 407, which displays it to the user and collects user responses. It then forwards user's indication of interest/purchase requested to the distribution server 409. The distribution server 409 sends an invoice on the purchased items to the mobile device for user review and approval. The mobile device 407 (actually the client software in the mobile device typically) prompts the user to enter a PIN code (or some such secret code) and to APPROVE the purchase. The mobile device collects user's PIN code and approval of the purchase and communicates it to the distribution server, which conducts sales transactions subsequently with the manufacturer or business system 411 or another external system.

Figure 5:
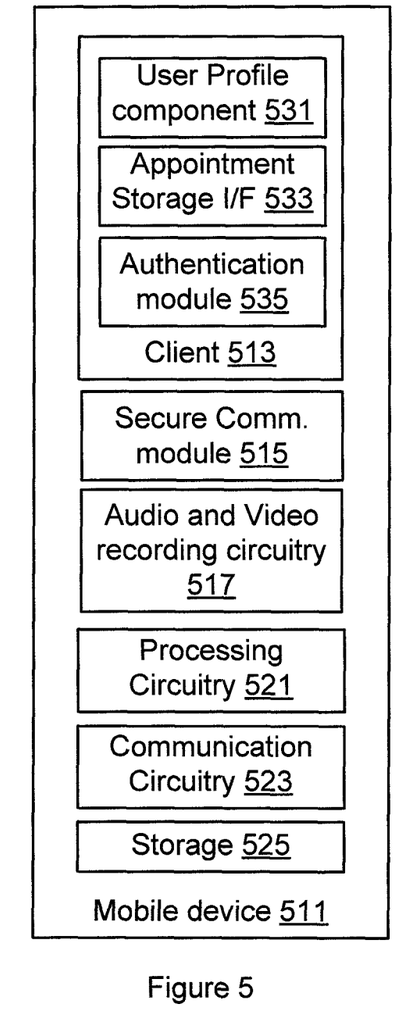
FIG. 5 is a schematic block diagram of a mobile device that comprises supports product list display, real estate list display and appointment storage wherein a distribution server communicatively coupled to the mobile device makes it possible to send the product list, real estate list and appointment for display to the user of the mobile device.

FIG. 5 is a schematic block diagram of a mobile device 511 that comprises supports product list display, real estate list display and appointment storage wherein a distribution server communicatively coupled to the mobile device 511 makes it possible to send the product list, real estate list and appointment for display to the user of the mobile device 511. The mobile device 511 comprises a client 513 that receives and displays interactive media such as questionnaires, product lists, advertisements, questionnaires with advertisements, audio guided activities, etc., a communication circuitry 523, and a secure communication module 515 that supports a SSL or TLS based communication. It also comprises a processing circuitry 521, a storage 525 and an audio and video recording and rendering circuitry 517. The client 513 comprises a user profile component 531 that provides user profile information such as a billing address, a billing account, a shipping address, user preferences for advertisements and questionnaires, etc. It also comprises an authentication module 535 that supports user authentication, PIN codes for sales approval, non-repudiation services, etc. and an appointment storage interface 533 that stores user requested appointment information sent by a distribution server.

Figure 6:
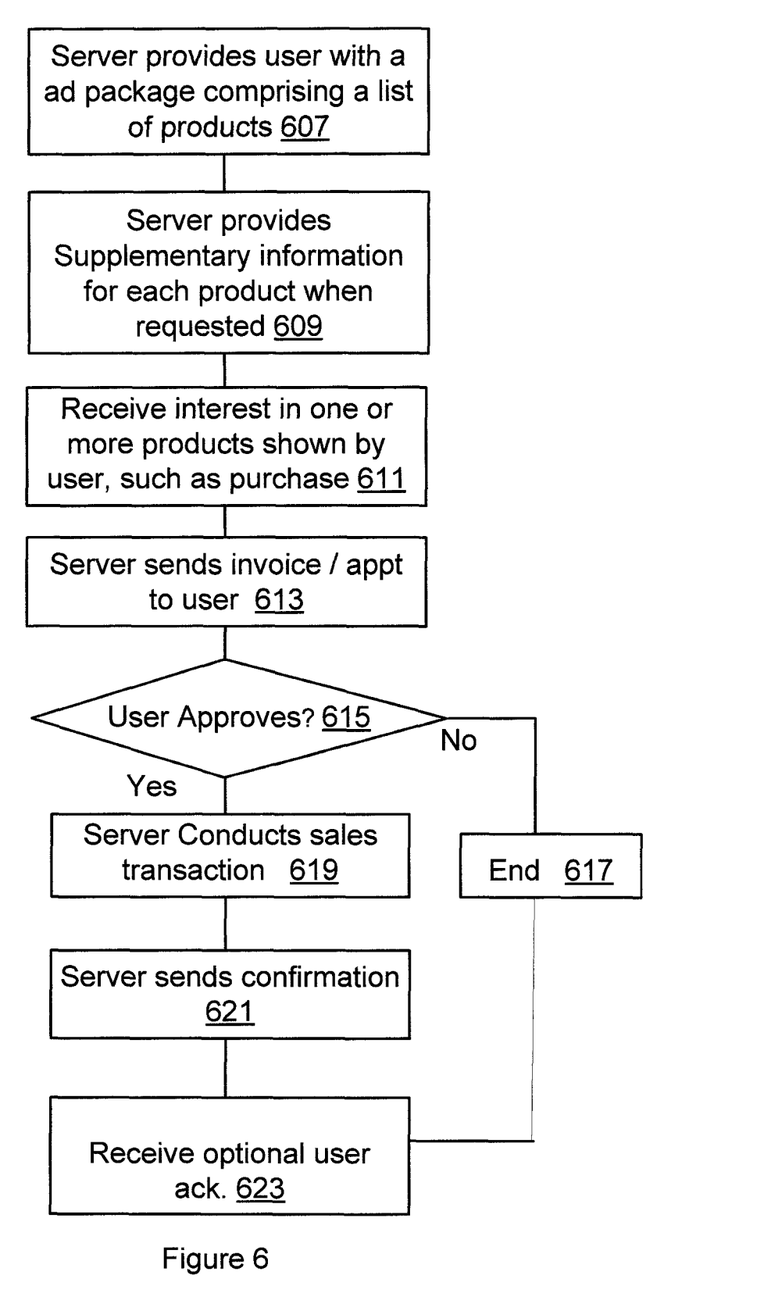
FIG. 6 is a flow chart of the operation of a distribution server as it receives communicates interactive media to users of mobile devices, wherein the interactive media comprises a product list that a user can show interest in or purchase, or real estate entries that a user can make an appointment to visit.

FIG. 6 is a flow chart of the operation of a distribution server as it receives communicates interactive media to users of mobile devices, wherein the interactive media comprises a product list that a user can show interest in or purchase, or real estate entries that a user can make an appointment to visit. At a start block 607, the operation starts when the server receives a product list from a provider of advertisements (a manufacturer, a branding company, an online sales company, etc.). At a next block 609, the server provides supplementary information, as necessary, to the mobile device of the user. The supplementary information comprises one or more of additional textual descriptions, additional audio inputs (details in audio form), detailed graphics, etc.

Then, at a next block 611, the server receives user response to one or more products from the list of products. Of particular interest to the distribution server are the user's request to purchase one or more of these products. Other types of user response that is of interest to some services include a user feedback of "very interested", "make an appointment", etc.—these user responses often trigger additional information delivery to the mobile device or some other action such as making an appointment and sending a reference to it via email.

Then, at a next block 613, the distribution server sends either an invoice in the case of a user's attempt to purchase, or an appointment notification in the case of a user's attempt to setup an appointment for a product trial or a visit to a real estate property. Both an invoice and an appointment need user approval before the corresponding actions can be taken. Then, at a next decision box 615, the distribution server determines user's response to its invoice or appointment. If it determines that the user has provided an approval, then it continues to a next block 619 where a sales transaction is conducted for user purchase and an appointment is confirmed for the scenarios where user has approved an appointment. Then, at a next block 621, the distribution server sends a confirmation to the user. Such confirmation can be via an SMS message, an email, a message sent to the client software in the mobile device that handles interactive media, etc. Then, at a next block 623, any additional acknowledgements sent by a user are received and processed before processing terminates at a next block 617.

If, at the decision block 615, the distribution server determines that the user has not provided an approval, then processing terminates at a next block 617.

Figure 7:
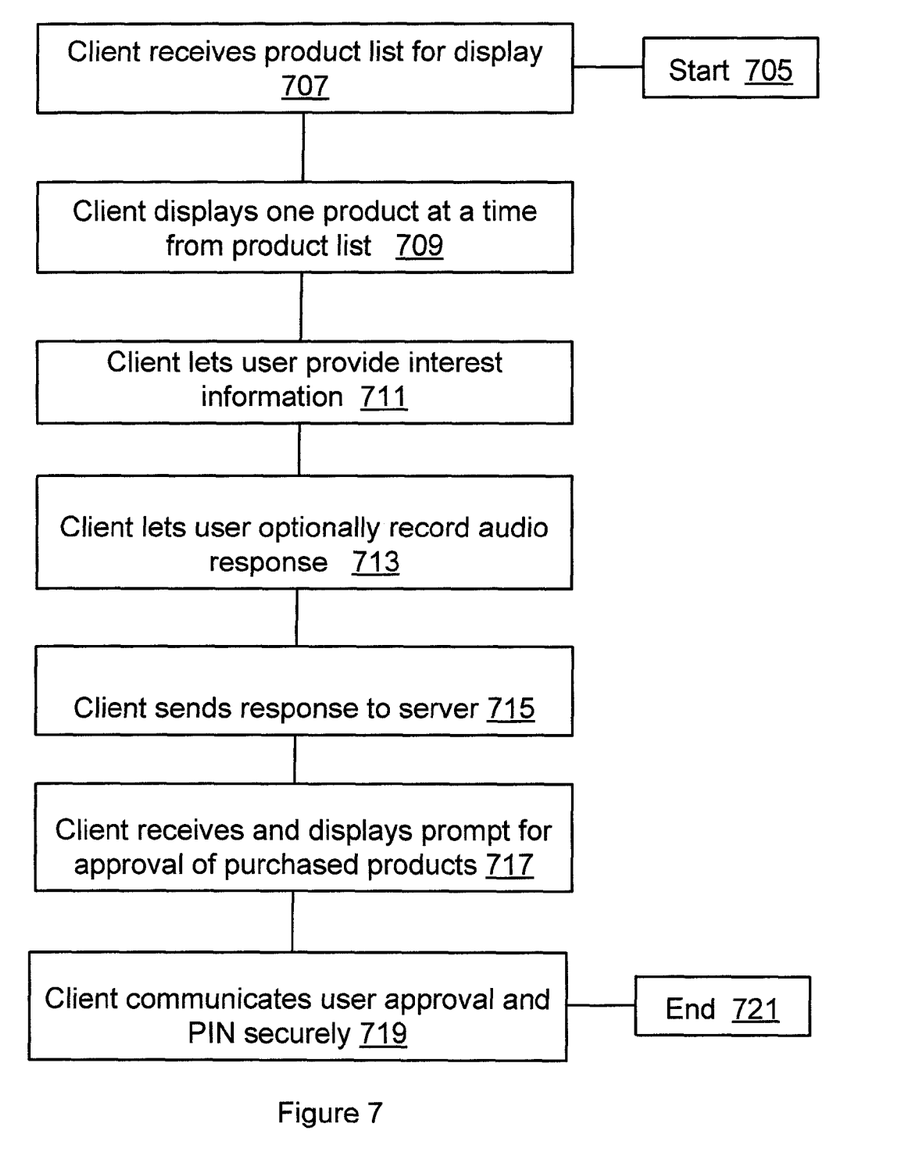
FIG. 7 is a flow chart of an exemplary operation of client software that is capable of displaying interactive media on a mobile device/laptop.

FIG. 7 is a flow chart of an exemplary operation of client software that is capable of displaying interactive media on a mobile device/laptop. Processing starts at a start block 705. Then, at a next block 707, the client receives a product list that it needs to display to a user. Alternatively, the client receives a notification of the availability of interactive media that it later retrieves. Then, at a next block 709, the client displays one product at a time from the product list (such as those provided by a remote distribution server). Then at a next block 711, the client lets a user read through the current product and provide interest information. For example, an individual product in the product list may prompt a user with radio buttons with the following choices:

Interested
Not Interested
Purchase

A user can select one of the choices from the multiple choices, (sometimes more than one may be selectable) and then move on to other products in the list.

At a next block 713, the client facilitates recording of an audio response by the user. Such an audio response can comprise of a request for an additional information on individual items that interest the user, feedback on items that the user has shown interest in, follow-up action requested by a user, such as setting up an appointment at a particular time/date for viewing the item or test the item (or viewing a house if the item is a real-estate for sale), etc.

Then, at a next block 715, the client software communicates user's responses and interest information provided by user to the distribution server. Then, at a next block 717, the client software receives and optionally displays a prompt for approval sent by the distribution server, such approvals necessary to conduct sales transactions and for setting up appointments, as necessary, based on user requests (such as for visiting specific residential properties, or for conducting product trials). The user is often required to provide a secret PIN code that is shared with the server (out-of-band). In addition, an Approve softkey is provided for user to approve of the sales transaction (for which an invoice is often displayed) or an appointment (for which details are displayed too). Then, at a next block 719, the client software communicates user approval along with a PIN code or other types of security codes provided by the user (as prompted to on the screen of the mobile device). The PIN code or other types of security codes are encrypted for security and confidentiality in one related embodiment, the distribution server (or an associated server) being capable of decrypting it. In a related embodiment, the communication of the PIN code and approval occurs over an SSL or TLS communication means. Finally, processing terminates at the next end block 721.

In one embodiment, the PIN code provided by the user that is sent to the distribution server 109 also serves as an user approval of the invoice presented to the user. Thus the PIN code serves not only as an authentication of user but also as an approval of the sales transaction represented by the invoice. In a related embodiment, the invoice is omitted and the user is prompted to enter the PIN code with only a total amount optionally displayed by the client in the mobile device (131, 133).

Figure 8:
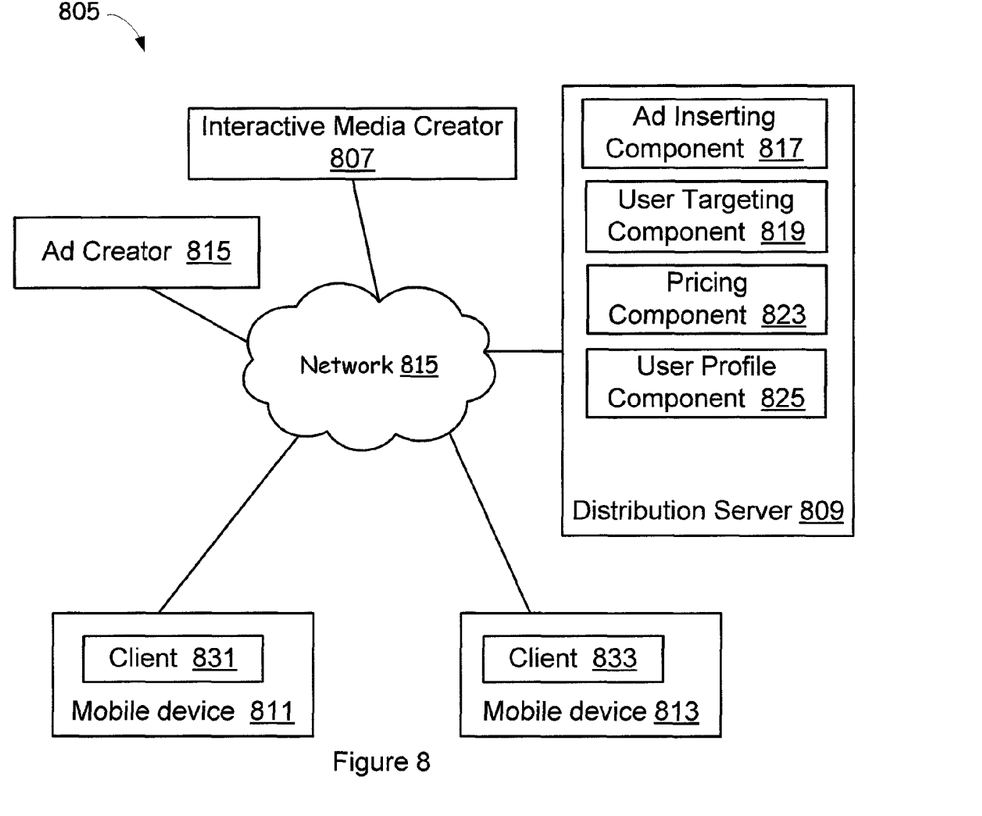
FIG. 8 is a schematic block diagram of a advertisement network that facilitates creation and distribution of product lists and advertisements, wherein a user can "purchase" some products, show interest levels in others and also be able to "make an appointment" to visit some place or try out some product or service.

FIG. 8 is a schematic block diagram of a advertisement network 805 that facilitates creation and distribution of product lists and advertisements, wherein a user can "purchase" some products, show interest levels in others and also be able to "make an appointment" to visit some place or try out some product or service. In accordance with the present invention, an ad creator 815 and an interactive media creator 807 facilitate creation of audio assisted content such as advertisements, questionnaires, etc. that make it possible for a viewer, such as a user of a mobile device 811, 813, to show interest in the products/services being displayed—including the ability to "purchase" such products or "make an appointment" to visit a real estate property or test a product in some trial. The content created is disseminated by a distribution server 809, and such content can be products for sale or services rendered, that a user might want to review and optionally indicate interest in, or indicate preference for, and provide some feedback and show interest in. The user interest information is also collected by the distribution server 809 and reported back to the ad creator 815 or the interactive media creator 807, or to alternate servers/computers. The advertisements and interactive media created is targeted to the mobile devices 811, 813 that are either identified by the a user sending the advertisements or interactive media (via ad creator 815 or interactive media creator 807) or, alternatively by the distribution server 109 employing a user targeting component 819.

The distribution server 109 can selectively adds boilerplate text, graphics, music etc. as needed, and forwards interactive media to specified recipient mobile devices. It selectively inserts advertisements provided by the ad creator 815 into interactive media created by the interactive media creator 807, employing an ad inserting component 817. In one embodiment, it provides pricing for advertisements being placed in interactive media being disseminated, such pricing being communicated to the ad creator 815, as needed.

User interest levels, received as responses to products listed and presented to a user on respective mobile devices 811, 833, for example, are processed by the distribution server 809, which subsequently conducts sales transactions or creates and forwards appointments based on user interests indicated.

Mobile users receive the user interest surveys on their mobile devices 811 and respond back to it with the help of the client 831. For example, they can show their user interest in one or more items (products, services, real estate entries, etc.) presented, which is captured and processed by the distribution server 809. Thus, user interest captured from the mobile devices 811, 813 (from users of the mobile devices) is processed, stored by the distribution server 809 to a repository, or reported back to the interactive media creator 807, another server/computer, to the email address of an interested party or entity, etc.

Users on PCs can receive interactive media on their PCs and respond to them. The PC requires a client component similar to the client 831 in the mobile device 811. Users of PCs can download & install a client before accessing the distribution server 809 or have interactive media communicated to them.

As one of ordinary skill in the art will appreciate, the terms "user interest survey" and "survey," as may be used herein, comprises polls, product surveys, and other forms of inquiries that are typically used by enterprises to gauge the interest of their potential customers on products and services they sell/provide. In particular, it comprises such forms of inquiry where a user is required to or requested to provide feedback comprising their levels of interest in the various products or services brought to their attention.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A client for a mobile device, the mobile device communicatively coupled to a server, the client comprising:
  a list of products retrieved or received from the server;
  the client capable of requesting and receiving the list of products from the server and presenting the list of products to a user;
  the client displaying each selected product from the list of products, along with an associated user interest solicitation, if available, soliciting a user's response;
  the client capturing the user's response and communicating the user's response to the server, wherein the client receives the user response employing an audio and video recording and rendering circuitry of the mobile device, if appropriate, and processes the user's response; and
  the client selectively prompting the user to enter a security code and securely communicating the security code, if provided by the user, to the server for user authentication or non repudiation.

2. The client according to claim 1, wherein the at least one product of the list of products is a real estate property for sale and wherein the associated user interest solicitation presented comprises one or more of a solicitation to communicate with an agent, a solicitation to indicate interest in making an appointment for visiting the real estate property, a solicitation to provide feedback, a prompt to activate a purchase request, and a prompt for additional information, the client further comprising:
  the client communicating the user's response that comprises one or more of a communication with an agent associated with a real estate property, indication of interest in making an appointment for visiting the real estate property, a feedback provided, a purchase request and a PIN code sent, and a request for additional information.

3. The client according to claim 2, wherein the client prompts the user to enter a security code when the user's response comprises a response indicating interest in making an appointment for visiting the real estate property for sale or a communication with an agent.

4. The client according to claim 3, further comprising:
  the client receiving notifications provided by the server and listing them for review by the user; and
  the client displaying selected one of the notifications.

5. The client according to claim 1, wherein the list of products comprises a list of real estate entries, each entry in the list of real estate entries comprises:
  details of a real estate property available retrieved from a Multiple Listing Service (MLS) database or MLS service; and
  other inputs if any provided by a real estate agent or service;
  wherein the client prompts the user to indicate an interest level, send a communication, provide feedback or request an appointment to visit the corresponding real estate entry.

6. The client according to claim 1, wherein the client prompts the user to enter a security code when the user's response comprises a response indicating interest in purchasing the at least one product of the list of products.

7. The client according to claim 6, wherein the client further comprising:
  the client receiving and displaying interactive media wherein interactive media is presented in one or more of the following forms: questionnaires, product lists, advertisements, questionnaires with advertisements and audio guided activities;
  the client soliciting an interest indication or a feedback on individual items of interactive media displayed to the user when it is selected by the user for display; and
  the client selectively prompting the user to purchase individual items of interactive media displayed to the user when it is selected by the user for display.

8. The client of claim 1 further comprising:
  access to a user profile that provides information comprising a billing address, an account, a shipping address, user preferences for advertisements and questionnaires and a PIN code; and
  the client employing at least one portion of the user profile in the purchase of a product, listed among the list of products, that is selected for purchase by the user.

9. The client of claim 1 further comprising:
  the user response triggering information delivery to the client, triggering the making of an appointment and sending a reference to the appointment to the client or via email, or triggering collection and communication of feedback on products or services that the user has shown interest in.

10. The client of claim 9 wherein the user responses is in audio form or in digital image form.

11. The client of claim 1 further comprising:
  the user responses comprising an approval information in response to which the client receives and presents a confirmation information.

12. The client of claim 1 wherein each product entry in the list of products, when selected, is presented using a product panel, with accompanying text, graphics, audio components, and available video clip, and wherein user interest is solicited in the product panel.

13. A client for a mobile device, the mobile device communicatively coupled to a system, the client comprising:
  a plurality of lists of real estate properties for sale in a region of interest to a user comprising different categories of real estate properties, wherein the user provides information on categories of interest via a user request or a user profile;
  the client presenting the plurality of lists of real estate properties to a user of the mobile device and permitting the selection by the user of one of the plurality of lists of real estate properties for display of a selected list of real estate properties;
  the client monitoring the selection of any of the entries in the selected list of real estate properties by the user and displaying details of a selected real estate property along with an user interest solicitation;

the client capturing a user's response to the user interest solicitation and communicating the user's response to the system; and the client selectively prompting the user to enter a security information for an account associated with the user and securely communicating the security information provided by the user to the system for user authentication and non repudiation.

14. The client of claim 13 further comprising:

the client capturing a user's response to the user interest solicitation and delivering additional information of interest to the user or supplementary information associated with the selected real estate property.

15. The client of claim 13 wherein the user's response comprises one or more of a communication with an agent associated with a real estate property, indication of interest in making an appointment for visiting the real estate property, a feedback provided, a purchase request and a PIN code sent, and a request for additional information.

16. The client of claim 13 wherein each entry in the selected list of real estate properties comprises:

details of a real estate property available that is retrieved from a Multiple Listing Service (MLS) database or MLS service; and other inputs, if any provided, by a real estate agent or service;

wherein the client prompts the user to indicate an interest level, send a communication, provide feedback or request an appointment to visit the corresponding real estate entry.

17. The client of claim 13 further comprising:

access to a user profile that provides information comprising a billing address, an account, a shipping address, user preferences and a PIN code.

18. The client of claim 13 wherein each real estate entry in the selected list, when selected, is presented using a display panel, with accompanying text, graphics, audio components, and available video clip, and wherein user interest is solicited in the display panel.

19. A client for a mobile device, the mobile device communicatively coupled to a server, the client comprising:

a list of products retrieved or received from the server;

the client capable of requesting and receiving the list of products from the server and presenting the list of products to a user;

the client displaying each selected product from the list of products, along with an associated user interest solicitation, if available, soliciting a user's response, wherein each selected product in the list of products, when selected, is presented using a product panel, with accompanying text, graphics, audio components, and available video clip, and wherein user interest is solicited in the product panel;

the client capturing the user's response and communicating the user's response to the server, wherein the client receives the user response employing an audio and video recording and rendering circuitry of the mobile device, as appropriate, and processes the user's response; and the client selectively prompting the user to enter a security code and securely communicating the security code, if provided by the user, to the server for user authentication or non repudiation.

\* \* \* \* \*